US008565267B2

(12) United States Patent
Zhou et al.

(10) Patent No.: US 8,565,267 B2
(45) Date of Patent: Oct. 22, 2013

(54) WEB BASED UNIFIED COMMUNICATION SYSTEM AND METHOD, AND WEB COMMUNICATION MANAGER

(75) Inventors: Yu Chen Zhou, Beijing (CN); Yi Min Gan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 710 days.

(21) Appl. No.: 11/912,880

(22) PCT Filed: Apr. 25, 2006

(86) PCT No.: PCT/EP2006/061807
§ 371 (c)(1),
(2), (4) Date: Dec. 31, 2007

(87) PCT Pub. No.: WO2006/114412
PCT Pub. Date: Nov. 2, 2006

(65) Prior Publication Data
US 2008/0215717 A1    Sep. 4, 2008

(30) Foreign Application Priority Data

Apr. 27, 2005    (CN) .......................... 2005 1 0068217

(51) Int. Cl.
*H04L 12/56* (2011.01)
*H04L 12/58* (2011.01)
*H04L 29/06* (2011.01)

(52) U.S. Cl.
USPC ............ 370/487; 370/535; 711/118; 711/202

(58) Field of Classification Search
USPC ...................................................... 370/487
See application file for complete search history.

(56) References Cited

U.S. PATENT DOCUMENTS

| 6,654,030 | B1 | 11/2003 | Hui | |
|---|---|---|---|---|
| 2001/0020954 | A1* | 9/2001 | Hull et al. | 345/730 |
| 2001/0040900 | A1* | 11/2001 | Salmi et al. | 370/487 |
| 2001/0049728 | A1* | 12/2001 | Kang | 709/219 |
| 2002/0145988 | A1* | 10/2002 | Dahlman et al. | 370/335 |

(Continued)

FOREIGN PATENT DOCUMENTS

| JP | 2000244889 A | 9/2000 |
|---|---|---|
| JP | 2001092706 | 4/2001 |

(Continued)

*Primary Examiner* — Asad Nawaz
*Assistant Examiner* — Jason Harley
(74) *Attorney, Agent, or Firm* — Patents on Demand P.A.; Brian K. Buchheit; Scott M. Garrett

(57) ABSTRACT

The present invention provides a Web based unified communication system and method, and Web based communication manger. In the present invention, generating a SMIL document, based on a communication request from a terminal, for starting and controlling a communication session between the terminal and corresponding terminals, and controlling the terminals and communication channels involved in the communication session to work collectively so as to perform the communication session by interpreting and executing the SMIL document. In the invention, instead of being a kind of supplementation, the Web technique should become the core technique of such systems. Further, in the invention, terminal may be a set of user devices, the set of user devices includes one or more devices, each of said devices provides media interaction capabilities for one or more communication channels, and each of said devices is mapped to one or more media objects in said SMIL document. Therefore, various devices may work collectively to perform a communication session.

21 Claims, 6 Drawing Sheets

(56) References Cited

U.S. PATENT DOCUMENTS

| | | |
|---|---|---|
| 2002/0156804 A1 | 10/2002 | Janakiraman et al. |
| 2003/0028660 A1 | 2/2003 | Igawa et al. |
| 2003/0101235 A1* | 5/2003 | Zhang ........................ 709/218 |
| 2003/0105925 A1* | 6/2003 | Yoshimura et al. ........... 711/118 |
| 2003/0156544 A1 | 8/2003 | Ido |
| 2004/0039834 A1 | 2/2004 | Saunders et al. |
| 2004/0163045 A1* | 8/2004 | Hui et al. ..................... 715/513 |
| 2004/0225753 A1 | 11/2004 | Marriott et al. |
| 2005/0005025 A1* | 1/2005 | Harville et al. ............... 709/241 |
| 2005/0018615 A1 | 1/2005 | Itoh et al. |
| 2005/0064883 A1 | 3/2005 | Heck et al. |
| 2005/0216851 A1* | 9/2005 | Hull et al. .................... 715/764 |
| 2005/0216919 A1* | 9/2005 | Hull et al. .................... 719/322 |
| 2005/0266884 A1* | 12/2005 | Marriott et al. ............... 455/558 |
| 2007/0118806 A1* | 5/2007 | Kondo et al. ................. 715/760 |
| 2007/0300232 A1 | 12/2007 | Marriott et al. |

FOREIGN PATENT DOCUMENTS

| | | |
|---|---|---|
| JP | 2002099285 A | 4/2002 |
| JP | 2003076704 A | 3/2003 |
| JP | 2003288361 A | 10/2003 |
| JP | 2003288361 A1 | 10/2003 |
| JP | 2003-338830 A | 11/2003 |
| JP | 2003323381 | 11/2003 |
| JP | 2003333579 | 11/2003 |
| JP | 2003338817 A | 11/2003 |
| JP | 2004280401 | 10/2004 |
| JP | 2004334695 | 11/2004 |
| JP | 2004341736 | 12/2004 |
| JP | 2005045605 A | 2/2005 |
| JP | 2005050126 A | 2/2005 |
| JP | 2005102220 A | 4/2005 |
| WO | 2004095197 | 11/2004 |
| WO | 2004095197 A1 | 11/2004 |
| WO | 2006/114413 A1 | 11/2006 |
| WO | 2006114413 A | 11/2006 |
| WO | 2008145679 | 12/2008 |

\* cited by examiner

```
<smil xmlns="http://www.w3.org/2001/SMIL20/Language">
    <head>
        <layout type="text/smil-basic-layout">
            <region id="caller-video-region" top="0px" left="0px" height="240px"
            width="320px"/>
            <region id="callee-video-region" top="0px" left="0px" height="288px"
            width="356px"/>
        </layout>
    </head>
    <body>
        <par>
            <par id="callee-presentation">
                <audio id="timer" begin= "0s" dur="15s">
                    <param name="caller-id" value="tom" valuetype="data" >
                    <param name="callee-id" value="alan" valuetype="data" >
                    <param name="type" value="timer" valuetype="data">
                </audio>
                <excl>
                    <par id="callee-call" begin="timer.endEvent">
                        <audio id="callee-voice">
                            <param name="caller-id" value="tom" valuetype="data>
                            <param name="callee-id" value="alan" valuetype="data>
                            <param name="type" value="call" valuetype="data" >
                        </audio>
                        <video id="callee-video" region="caller-video-region"
                        end="callee-voice.endEvent >
                            <param name="type" value="call" valuetype="data" >
                            <param name="model" value="push" value="data">
                            <param name="caller-id" value="alan" valuetype="data" >
                            <param name="callee-id" value="tom" valuetype="data" >
                        </video>
                    </par>
                    <par id="message-greeting" begin="timer.end"
                    dur="greeting-length">
                        <audio id= "greeting-voice"  address">
                            <param name="caller-id" value="tom" valuetype="data" >
                            <param name="callee-id" value="alan" valuetype="data" >
                            <param name="type" value="play-greeting"
                            valuetype="data>
```

Fig. 4

```
                </audio>
                <video id="greeting-video" region="caller-video-region" >
                    <param name="caller-id" value="alan" valuetype="data" >
                    <param name="callee-id" value="tom" valuetype="data" >
                    <param name="type" value="play-greeting"
                    valuetype="data" >
                    <param name="model" value="push" value="data">
                </video>
            </par>
        </excl>
    </par>
    <excl id="caller-presentation">! to callee
        <par id="caller-call" begin="callee-call.beginEvent">
            <audio id="caller-voice">
                <param name="caller-id" value="tom" valuetype="data" >
                <param name="callee-id" value="alan" valuetype="data" >
                <param name="type" value="call" valuetype="data" >
            </audio>
            <video id="caller-video" region="callee-video-region"
            end="caller-voice.end">
                <param name="caller-id" value="tom" valuetype="data" >
                <param name="callee-id" value="alan" valuetype="data" >
                <param name="type" value="call" valuetype="data" >
                    <param name="model" value="push" value="data">
            </video>
        </par>
        <par id="caller-message" begin="message-greeting.endEvent"
        dur="message-duration">
            <audio id="caller-voice">
                <param name="caller-id" value="tom" valuetype="data" >
                <param name="callee-id" value="alan" valuetype="data" >
                <param name="type" value="record-message" valuetype="data" >
            </audio>
            <video id="caller-video" end=c"caller-voice.endEvent">
                <param name="caller-id" value="tom" valuetype="data" >
                <param name="callee-id" value="alan" valuetype="data" >
                <param name="type" value="record-message" valuetype="data" >
                <param name="model" value="push" value="data">
            </video>
        </par>
    </excl>
    </par>
    </body>
</smil>
```

Fig. 4 (contiuned)

WEB BASED UNIFIED COMMUNICATION SYSTEM AND METHOD, AND WEB COMMUNICATION MANAGER

CROSS-REFERENCE TO RELATED APPLICATIONS

This is the U.S. National Stage of PCT/EP2006/061807 filed 27 Apr. 2005, which claims priority from Chinese Patent Application No. 200510068217.7 filed 27 Apr. 2004, which is hereby incorporated by reference.

BACKGROUND OF THE INVENTION

1. Technical Field

The present invention generally relates to the field of communications, in particular, to a unified communication system that integrates different kinds of communication channels, applications, data types and data sources.

2. Technical Background

At present, there are more and more communication devices, each of which has own unique convenience. Consequently, a person may have many ways for getting in touch with others and, as a result, has many numbers to be remembered, such as a mobile telephone number, a home telephone number, an office telephone number, a facsimile telephone number, one or more electronic mail box addresses and so on. From the viewpoint of convenience, a user hopes to be able to get information sent to him with any kind of communication device at any time and any place and hopes the information sent by him will be received by the receiver eventually.

For the first requirement, with respect to the issue that different devices have different addresses, a Unified Messaging System (UMS) has been proposed. The Unified Messaging System coordinates audio mails, electronic mails and facsimiles so that all of the messages are stored in the same location and may be accessed from different devices, including telephone sets and PC computers. This system enables a user to be able to use one single device to manage all messages and multiple devices can access this device to get these messages. For instance, a user in a vehicle can use a mobile telephone to send and/or receive electronic mails, or search audio mails and facsimiles with a computer.

For the second requirement, different devices need to be routed from one to another and information needs to be converted from one to another in order to make the information be received finally by a user, which is the so called Unified Communication System (UCS). The UCS system adds a 'person-to-person' communication function over the UMS's 'machine-to-machine' interaction. A user may define what device at what time will be the primary communication device, and information sent to other devices may be transferred to this device; the user may further define filtering criteria for received information. Thus, for each person, only one of his numbers needs to be remembered for sending information to him.

In order to achieve the goal of 'person-to-person' communication of the Unified Communication System, the first technical issue to be addressed is how to integrate the conventional telecommunication services with the rapidly developing Web application, that is, to establish a unified platform so as to make different kinds of messages (such as audio, video, text, animation, etc.) be routed between different kinds of devices through corresponding communication channels (including synchronous communication channel supporting two party call and conferencing, half-synchronous communication channel supporting instant messaging and push to talk, and asynchronous communication channel supporting electronic mail and multimedia message) and finally arrive at the user.

Conventional telecommunication systems, such as a circuit and packet switched systems, use a signaling protocol, such as SS7, and a specific architecture that is quite different from the web based architecture to control a communication session. As a result, it is difficult to realize a unified communication function based on a conventional telecommunication system and to make the rapidly developing Web technology to be the core technology.

With the development of the IP networks, it is already possible to integrate IP based services into the telecommunication system. At present, many standards have been defined for creating an IP based multimedia communication system. A typical one of them is IP multimedia subsystem (IMS), defined by the $3^{rd}$ Generation Mobile Communication Standard Partnership Project (3GPP). IMS uses an IP network, such as GPRS, as a carrier to provide a unified platform for IP multimedia services. 3GPP IMS applies a hierarchical architecture, which is divided into three layers, that is, service network layer, IP multimedia core network layer and access network layer. The access network supports many kinds of techniques, including 3GPP GPRS, WLAN and others, for providing management of accessing and mobilization. The IP multimedia core network is based on a simple control protocol (SIP) and supports Ipv6. The IP multimedia core network is responsible for session control of the multimedia services, providing QoS support and billing management. The service network provides techniques for many kinds of services, promoting the development of multimedia services through the opened service interface and SIP. While this kind of system may support many kinds of application servers, such as servers for providing conventional telephone service as well as application servers for providing non-conventional telephone services, such as instant messaging, video streaming and multimedia messaging, they only functionally expand the IP network and related techniques and still follow the working way of the conventional telecommunication system. For instance, the architecture and basic concepts are still based on the signaling protocol. In such systems, Web technique is only a supplemental rather than a core technique, for instance, Web technique is always used to enhance a user interface (UI) and expand applications.

With the further development of Web technique, people more and more rely on Web based applications. In order to meet the 'person-to-person' communication requirement of the unified communication system, instead of being a kind of supplementation, the Web technique should become the core technique of such systems. So, it is strongly desirable to have a Web based unified communication system and methods.

Besides, Web based collaborated applications (such as electronic white board) have become more and more popular, whereas the media interaction capability of different kinds of pervasive computing devices is rather limited. So, it is also strongly desirable to have a system and methods for making different kinds of devices able to work in collaboration with each other so as to perform collaborated applications.

SUMMARY OF THE INVENTION

For these purposes, the present invention provides a Web based unified communication system, comprising: a plurality of terminals being operative for communicating with each other; a plurality of communication channels, each of which is used for one kind of application or one kind of communication modal; and at least one Web communication manager for generating a SMIL document, based on a communication request from a terminal, for starting and controlling a communication session between the terminal and corresponding terminals, and controlling the terminals and communication channels involved in the communication session, through the interpretation and execution of the SMIL document, to work collectively so as to perform the communication session.

According to another aspect of the present invention, there is provided a Web based unified communication method, comprising following steps: receiving a communication request from a terminal; generating a SMIL document, based on the communication request from the terminal, for starting and controlling a communication session between the terminal and corresponding terminals; and interpreting and executing said SMIL document to control the terminals and communication channels involved in the communication session to work collectively so as to perform the communication session.

According to still another aspect of the present invention, there is provided a communication manager for generating a SMIL document, based on a communication request from a terminal, for starting and controlling a communication session between the terminal and corresponding terminals, and controlling the terminals and communication channels involved in the communication session, through interpretation and execution of the SMIL document, to work collectively so as to perform the communication session.

In the Web based unified communication system and method as well as Web communication manager according to the present invention, the communication session between terminals is started and controlled through generating, interpreting and executing a SMIL document that is used for defining communication control logics between the terminals involved in the communication session. In such Web based unified communication system and method as well as Web communication manager, the Web technique is no longer used as a supplementation, but a core technique.

Preferably, in the Web based unified communication system and method according to the present invention, a terminal may be a set of user devices and the set of user devices may include one or more devices, each provides media interaction capability for one or more communication channels, and each device may be mapped to one or more media objects in said SMIL document. Thus, it is possible to make the devices having corresponding media interaction capabilities work in collaboration with each other to perform the communication session by deploying different kinds of media objects in said SMIL document onto these devices.

BRIEF DESCRIPTION OF THE DRAWINGS

The present invention will now be described, by way of example only, with reference to the accompanying drawings in which:

FIG. 4 shows an example of a SMIL document generated by the Web communication manager.

DETAILED DESCRIPTION OF THE INVENTION

In order to understand the present invention, a brief introduction is given to the SMIL language before describing the preferred embodiments according to the present invention in detail.

SMIL (Synchronized Multimedia Integration language) is a XML based multimedia presentation control language defined by World Wide Web Consortium (W3C), mainly for controlling presentation time and spatial placement of various kinds of multimedia. SMIL has been widely used in different areas, such as Web TV, on-line course. SMIL makes software developers able to integrate various kinds of media (such as, animation, audio, video, still image, static text and text stream) and to synchronize them based on a timeline. The present invention applies the advantages of the SMIL in media integration and time control to the unified communication system, using a SMIL document for defining communication control logics in a communication session between different terminals, and starting and controlling the communication session between different terminals through interpretation and execution of the SMIL document. Thus, the Web technique becomes the core technique of the system.

Next, with reference to the drawings, a detailed description will be given to the preferred embodiments according to the present invention.

Figure 1:
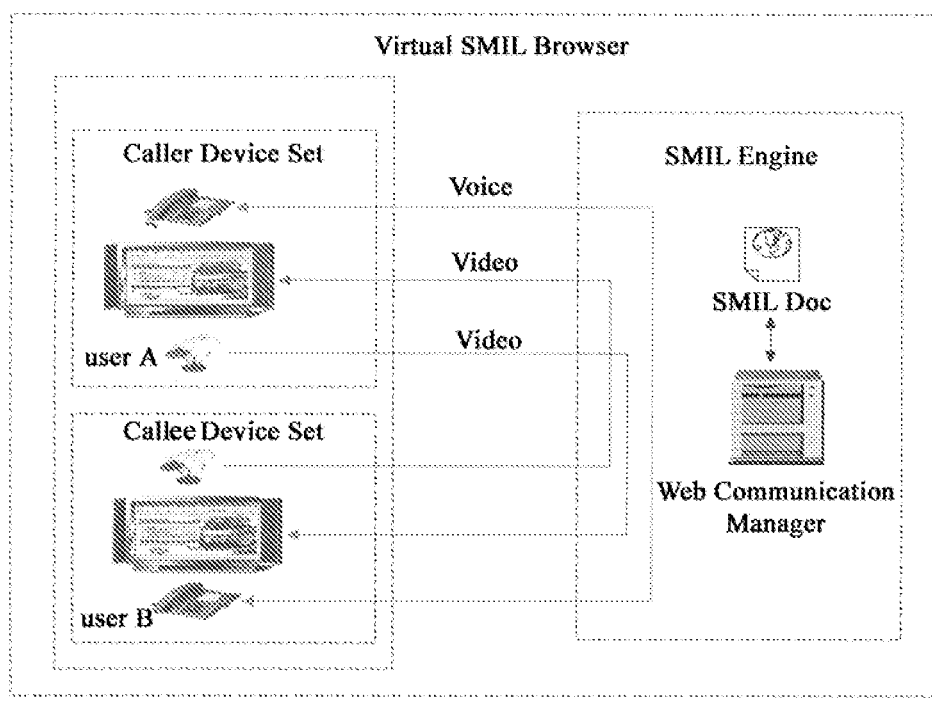
FIG. 1 is a conceptual diagram illustrating the working principles of the Web based unified communication system according to a preferred embodiment of the present invention.

FIG. 1 is a conceptual diagram illustrating the working principles of the Web based unified communication system according to a preferred embodiment of the present invention. In the system shown in FIG. 1, there is a visual talk between user A (caller) and user B (callee). Both of user A's device set and user B's device set include a plurality of devices (such as POTS phone, TV set and camera), each device provides media interaction capability for one or more communication channels and will be mapped to one or more media objects in the SMIL document. Besides, in the system, conventional telecommunication system and other applications will be used as underlying communication channels supporting specific types of media and data.

As shown in FIG. 1, in the Web based unified communication system according to the present invention, in order to make a visual talk with user B, user A may first dial user B's telephone number through a POTS phone, and the Web communication manager in the system will receive the communication request. Based on this communication request, the Web communication manager will generate a SMIL document to define communication control logics for the visual talk between user A and user B. In the SMIL document, the media objects (audio and video) involved in the process of visual talk and synchronization relationship between them are defined with resource elements and time elements. Then, the SMIL document is interpreted and executed by the Web communication manager. Due to the fact that in the Web based unified communication system according to the present invention each user device and bottom layer communication channel (conventional telecommunication channel and other applications) is mapped to one or more media objects in said SMIL document, it is possible, through controlling the media objects during the process of the interpretation and execution of the SMIL document (that is, the playing process of SMIL document or the presentation process of Web based media to the caller, the callee and other terminals involved in the communication session), to realize the control of the user devices involved in the process of the visual talk and underlying communication channels, making them to work in collaboration with each other so as to perform the visual talk, that is, the Web communication manager, during the process of the interpretation and execution of the SMIL document, maps the media object 'audio' onto the POTS phone and maps the media object 'video' onto the TV set and the camera, and controls the corresponding audio and video channels to transfer information between these devices based on the synchronization relationship defined by the time elements in the SMIL document, so as to perform the visual talk through the collaboration of the POTS phone, TV set and the camera.

In the Web based unified communication system according to the present invention, the whole system is implemented as a virtual SMIL browser, the process of unified communication and collaboration is implemented as a process of Web browsing, and all nodes in the system are implemented as Web services independent of any signaling protocol. From the viewpoint of users, a call is browsing of a SMIL document in the system, and from the viewpoint of the system, a call process is just a playing process of a SMIL document among all devices of the caller, callee and other terminals involved in the communication session.

Figure 2:
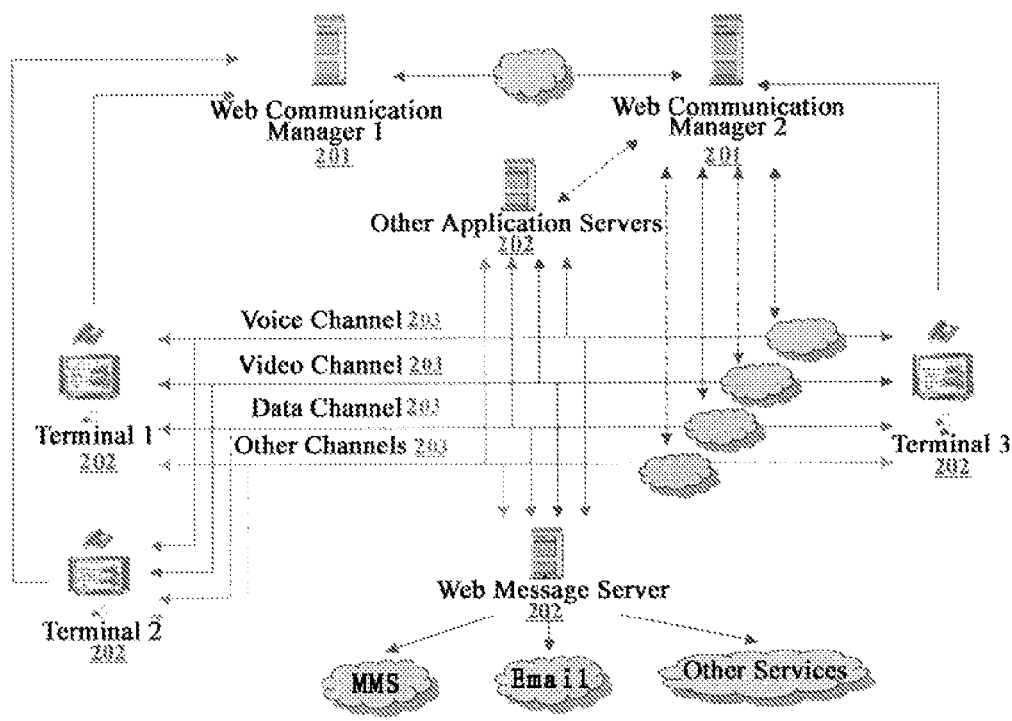
FIG. 2 shows the structure of the Web based unified communication system according to a preferred embodiment of the present invention.

Above-mentioned features of the present invention may become more apparent from the detailed description of the Web based unified communication system according to a preferred embodiment of the present invention with reference to FIG. 2.

As shown in FIG. 2, the Web based unified communication system according to a preferred embodiment of the present invention includes following nodes: Web communication manager 201, terminal 202 and communication channel 203.

Terminal 202

In the present invention, terminal is a virtual concept that may be a set of user devices serving an end user or any kind of application servers involved in a communication session. A user uses a device in the user device set to start, response and control one or more communication sessions. The user device set for a terminal includes one or more devices, each of which provides media interaction capability used for one or more communication channels. Each device is mapped to one or more media objects in said SMIL document. Thus, when a communication session involves different kinds of media objects, the Web communication manager may dynamically deploy them onto different devices of the user, and the communication session may be performed with the collaborated work of these devices. Devices used for a terminal may be registered to the Web communication manager statically or dynamically before starting a related communication session. For instance, in the example shown in FIG. 1, both of the device sets of user A and user B include POTS phones, TV sets and cameras. In other examples, a user may use a mobile telephone and a networked projector closest to a conference room to create a virtual terminal with UDDI or UpnP, then start a visual talk. In the present invention terminal is only a virtual concept, however, in the process of a practical session the terminal for the communication session may be configured dynamically according to different situation. For instance, at home, the configuration of a terminal used for a visual talk may be SIP telephone/POTS telephone/mobile telephone+STB/SG+TV+Web camera; in a office, it may be IP telephone+IP-PXB+PC+camera; in a mobile environment, it may be SIP UA+PDA (802.11b/GPRS/ . . . )+camera.

In addition to terminals constructed of user devices, another kind of terminals is various application servers involved in a communication session. In order to realize 'person-to-person' communication in the unified communication system, usually a message server is provided in a unified communication system. When there is no response from the callee within a predefined time period, the message from the caller will be recorded in the message server, and when a certain condition is satisfied the message will be played back to the callee. Thus, a SMIL based Web message server is a typical application server provided in the Web based unified communication system according to a preferred embodiment of the present invention. The message server provides following functions:

recording real scenario of caller or callers as a SMIL based multimedia message with timing features:—

While there is no response from the callee terminal within a predefined period, the Web communication manager will connect the caller to the SMIL based Web message server and control the message server to record audio, video, data, instant message and event from the caller and also the time relation among such communication channels as a SMIL based multimedia message with timing features. The recording process could be terminated by a timer or caller actions. Due to the fact that the SMIL based multimedia message recorded by the message server contains timing features, there is no need to use any built-in synchronization mechanism between various channels (such as audio and video channels).

recurring the scenario of caller or callers recorded as a SMIL based multimedia message with timing features:—

While the callee or callees ask for playing back recorded caller scenario, the Web communication manager will request for the recorded SMIL based multimedia message from the message server, then compose a SMIL document for defining a recurring control logic. The Web communication manager interprets and executes the SMIL document that defines the recurring control logic, so as to control the message server to playback the synchronized data coming from different communication channels to the callee terminal based on the recorded timing features.

Communication Channel 203:—

In the present invention, each communication channel is defined as one kind of application or communication modal, for instance, such as VoIP, instant message, electronic whiteboard based collaboration, or connection to an application server. In a Web based unified communication system, each communication session involves one or more communication channels, and each communication channel contains parties involved in the communication session, for instance, the caller and callee in a two party call, multiple callers in a teleconferencing and the client and server of an application. Logically, a communication channel should belong to one communication or application domain.

Web Communication Manager 201:—

In the Web based unified communication system according to the present invention, the Web communication manager 201 is used to generate a SMIL document, based on a communication request from a terminal, for starting and controlling a communication session between the terminal and corresponding terminals, and control the terminals and communication channels involved in the communication session through the interpretation and execution of the SMIL document, to work together so as to perform the communication session.

In the present invention, the unified communication system may be divided into a plurality of communication domains, each communication domain contains at least one Web communication manager. Usually, during a communication session, the caller terminal is controlled by the Web communication manager of the callee terminal through the Web communication manager of the caller terminal.

Figure 3:
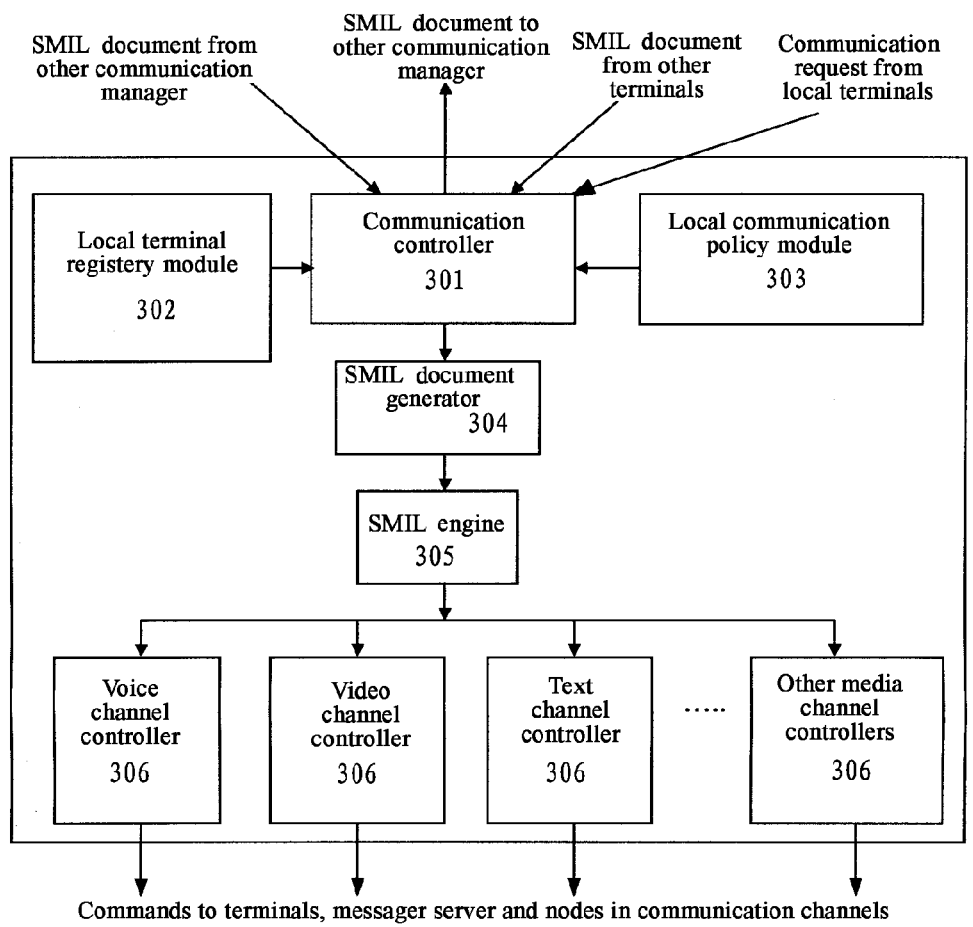
FIG. 3 shows the structure of the Web communication manager according to a preferred embodiment of the present invention.

FIG. 3 shows the structure of the Web communication manager according to a preferred embodiment of the present invention. As shown in FIG. 3, the Web communication manager according to a preferred embodiment of the present invention includes: local terminal registry module 302, for managing terminal information of all terminals that are local relative to the Web communication manager; local communication policy module 303, for managing local communication policy information; communication controller 301, for executing various SMIL based communication control tasks in the Web based communication control layer; SMIL document generator 304, for generating a SMIL document used for starting and controlling of a communication session between terminals; SMIL engine 305, used for interpreting and executing the SMIL document generated by said SMIL document generator; and a plurality of channel controllers 306, for controlling respective communication channels to perform the communication session. Next, a detailed introduction will be given on the various parts of the Web communication manager according to a preferred embodiment of the present invention.

Local terminal registry module 302 is used for managing terminal information of all terminals that are local relative to the Web communication manager. All terminal devices that are local relative to the Web communication manager should be registered statically or dynamically to the local terminal registry module 302 before starting related communication session. Terminal information managed by the local terminal registry module 302 includes, for example, terminal IDs, terminal device IDs, terminal device's media capabilities (video, audio, instance message, electronic mail, etc.) and related features (media format, supported protocol, terminal device's network address, etc.), and user's preference (terminal device preferred among those that have the same media capability, etc.). The information will be used for generating SMIL document and further used for controlling a communication session.

Local communication policy module 303 is used for managing local communication policy information. Local communication policy information includes, for example, a waiting time for routing to message service if a terminal in the communication domain is a callee.

Communication controller 301 is used for executing various SMIL based communication control tasks in the Web based communication control layer. The communication controller mainly executes following tasks:

To communicate with local terminals, receiving communication requests from local caller terminals. When the callee terminal and the caller terminal involved in the communication session are in different communication domains, the communication controller communicates with the local terminal registry module and local communication policy module to get terminal device information and local communication policy related to the caller terminal, controls the SMIL document generator to generate a SMIL document for describing the caller terminal device based on above information, and sends the SMIL document to the Web communication manager in the communication domain where the callee terminal is located. When the callee terminal and the caller terminal involved in the communication session are located in the same communication domain, the communication controller communicates with the local terminal registry module and local communication policy module to get terminal device information and local communication policy related to the caller terminal and the callee terminal, and controls the SMIL document generator to generate a SMIL document for defining the communication control logic of the communication session between the caller terminal and the callee terminal.

To communicate with the Web message server, receiving SMIL based multimedia messages with timing features and controlling the SMIL document generator to generate a SMIL document for defining the communication control logic of playing back the multimedia message to the local terminal.

To communicate with a remote Web communication manager, receiving a SMIL document for describing the caller terminal device, and controlling the SMIL document generator to generate a SMIL document for describing the callee terminal device based on the terminal device information and local communication policy related to the callee terminal in the local terminal registry module and the local communication policy module and a SMIL document for describing the Web message server in the communication domain, and generating a SMIL document for defining communication control logic of the communication session between the caller terminal and the callee terminal after matching these three SMIL documents.

To communicate with other application servers in the unified communication system.

SMIL document generator 304 is used for generating a SMIL document for starting and controlling of a communication session between terminals. SMIL document generator 304 is used for generating a SMIL document for describing the terminal devices based on terminal device information and local communication policy and organizing SMIL documents coming from the caller terminal, the callee terminal and the message server to generate a SMIL document for controlling the communication session. FIG. 4 shows a simplified SMIL document for defining communication control logic of a communication session of two party call communication session with message service. The SMIL document is generated by a SMIL document generator in the Web communication manager of the callee, mainly including: time container containing all media objects that represent media sources coming from the callee terminal or message server and will present on the caller terminal as well as timing and event dependency; time container containing all media objects that represent media sources coming from the caller terminal and will present on the callee terminal as well as timing and event dependency; and time container containing all media objects that represent media sources coming from the message server and will present on the callee terminal as well as timing and event dependency.

SMIL engine 305 is used for interpreting and executing the SMIL document generated by said SMIL document generator, and controlling the communication session through controlling respective channel controllers.

A plurality of channel controllers 306 are used for controlling respective channels to perform the communication session. During a communication session, each channel controller controls the directly sending or receiving of media stream between respective terminal devices based on commands from SMIL engine 305. For instance, an audio channel controller may be used to control an IP-PBX to initiate a third party call so as to connect the IP telephones between the caller and the callee.

A detailed description of the structure of the Web based unified communication system according to a preferred embodiment of the present invention and the structure of the Web communication manager according to a preferred embodiment of the present invention has been given above with reference to the drawings.

Next, the process of a communication session in the Web based unified communication system according to a preferred embodiment of the present invention will be described with reference to FIG. 5.

Figure 5:
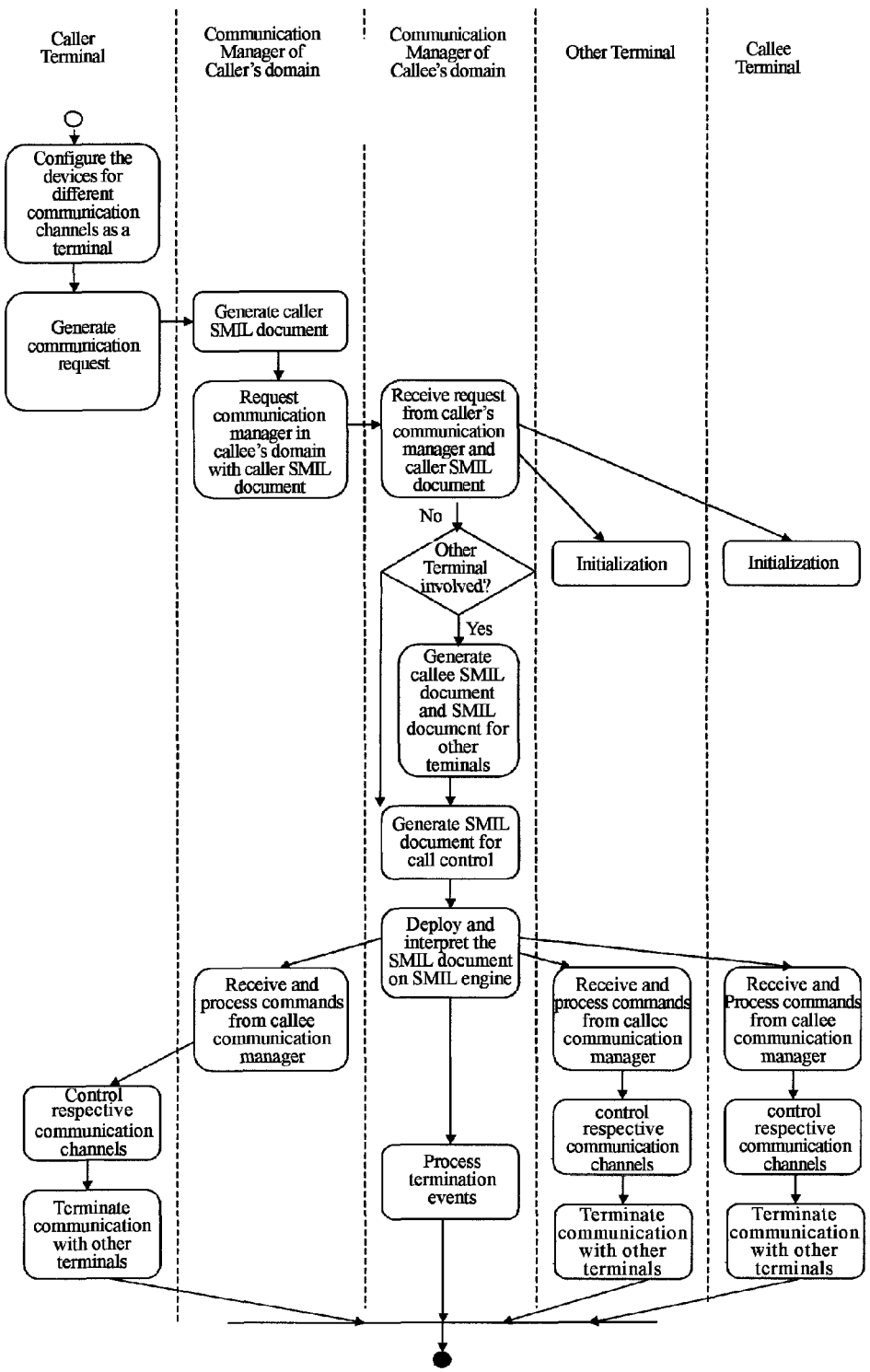
FIG. 5 shows the process of a session in the Web based unified communication system according to a preferred embodiment of the present invention.

As shown in FIG. 5, in order to start a communication session, the caller configures its terminal devices and sends a communication request to the local Web communication manager through a device in its terminal device set. Then, the caller's Web communication manager generates a SMIL document for describing the caller's terminal devices based on the caller terminal's information stored in the local terminal registry information module and the local communication policy, and contacts the callee's Web communication manager. The SMIL document contains communication channels supported by the devices of the caller's terminal that participate the communication, the caller's data source and destination, as well as timing and synchronization features produced based on the local communication policy.

Once the caller's Web communication manager has found the Web communication manager in the callee's communication domain, the former will send the later a request that contains the callee ID (or IDs) and a SMIL document generated by the caller's Web communication manager for describing the caller terminal. After that, the callee's Web communication manager generates a SMIL document for describing the callee terminal that contains the communication channels, data source and destination usable by the callee and timing and synchronization features based on the local communication policy. If, there are other terminals involved in the communication session, such as Web message server and other application servers, the callee's Web communication manager also generates SMIL documents for describing such terminals. During this process, all terminals of the callee should be initialized. Usually, if there is no response from the callee within a predefined period, the Web message server will record the caller's session scenario through the SMIL based multimedia message with timing features. Finally, the callee's Web communication manager performs match on these three SMIL documents, to generate a SMIL document that contains matched communication channels, timing and synchronization features, for defining communication control logic of the communication session.

Then, the SMIL document generated for defining the communication control logic is deployed to the SMIL engine and interpreted and executed by the SMIL engine, as a result, various media are presented, in the form of SMIL based Web presentation, on the caller terminal's devices, callee terminal's devices and other terminals involved in the communication session. When the SMIL engine begins to execute the SMIL document that defines the communication control logic, the callee's Web communication manager will, through the caller's Web communication manager, control various devices of the caller terminal and controls directly various devices of the callee terminal and other terminals in the callee's communication domain, making these terminals to send and receive media stream and data to and from each other. During this process, if a termination event is encountered, the callee's Web communication manager will inform these terminals of stopping sending and receiving media stream and data.

The Web based unified communication system and method according to a preferred embodiment of the present invention has been described above by a simplified two party communication session with message service as an example. For those skilled in the art, it is clear that the Web based unified communication system and method according to the present invention may meet the requirement of various practical communication sessions. For instance, for the applications, such as electronic whiteboard and conference, just multiple callees, multiple Web communication managers and multiple other applications are involved in the communication session, and the timing and synchronization features will become more complicated. Besides, in order to meet the requirement of 'person-to-person' communication of the unified communication system, the Web communication manager may convert a multimedia message into a multimedia short message, electronic mail or others, thus, some other applications may be involved during the whole communication session. But, due to the fact that in the Web based unified communication system, conventional telecommunication systems and other applications are used as underlying channels supporting special type of media or data, adding an application is just adding a corresponding channel controller into the whole system only, having no effect to the whole system structure.

From above, it can be seen that the Web based unified communication system and method according to the present invention has following features:

In the present invention, the actions of user's starting and controlling communication are defined as Web browsing and multi-modal Web interaction;

In the present invention, SMIL documents are used for defining communication and collaboration logics, including: synchronization, timing and communication session between respective communication channels as well as interaction process between users;

In the present invention, a communication session is defined as a Web based media presentation process to the all devices of the caller, the callee and other terminals involved in the communication session;

In the present invention, the whole communication process is based on the Web technique, rather than based on a telecommunication or VoIP signaling protocol. Typically, the communication control process may be implemented as a series of Web service invocations. For each terminal, the data resources are other terminals involved in the communication session; and In the present invention, a recorded multimedia message is a complex scenario containing the contents from respective communication channels, including media presentation at fixed time, internal event, user interaction and application invocation.

Thus, the Web based unified communication system according to the present invention may have following advantages:

A unified communication system is constructed by using Web technique, and telecommunication or IP telephone systems (and messaging system, conferencing system and others) are connected into the system in a way of plug-in as underlying communication channels supporting special types of media or data;

User devices are configured on demand and various user devices work in collaboration with each other, forming a virtual communication terminal with relatively powerful media interaction capability. For a communication session, there is no need to have specific terminals. The Web communication manager in a communication session may integrate different kinds of pervasive computing devices (such as telephone set, PDA, camera, etc.), forming a virtual communication terminal;

It is possible for a unified communication system to flexibly integrate with other Web based applications, and to be routed dynamically between different data sources;

It is easy to change application logics and add communication channels; and

The system is independent of specific communication protocols, such as signaling protocol or data transfer protocol, applied by the communication channels.

Though the present invention has been illustrated and described with reference to preferred embodiments, those skilled in the art will appreciate that various modifications may be made within the spirit and scope of the present invention.

The invention claimed is:

1. A Web based unified communication system, including: a plurality of terminals being operative for communicating with each other; a plurality of communication channels, each of which is used for one kind of application or one kind of communication modal; at least one Web communication manager local to one or more of the plurality of terminals for generating a SMIL document, based on a communication request from a terminal, for starting and controlling a communication session between the terminal and corresponding terminals, and controlling the terminals and communication channels involved in the communication session, through the interpretation and execution of the SMIL document, to work collectively so as to perform the communication session, wherein the Web communication manager uses the SMIL document that was generated to establish a connection between the terminals involved in the communication session, wherein once the Web communication manager establishes the connection, the terminals involved in the communication session communicate with each other directly; wherein the Web communication manager comprises a communication controller that executes one or more SMIL based communication control tasks in a Web based communication control layer, a SMIL document generator that generates a SMIL document used for starting and controlling of a communication session between said terminals, a SMIL engine that interprets and executes the SMIL document generated by said SMIL document generator to produce commands that control the respective channel controller, and a plurality of channel controllers that control respective communication channels and terminals to perform the communication session, wherein each of the channel controllers are handled by one of the terminals involved in the communication session.

2. The Web based unified communication system according to claim 1, wherein said terminal comprises a plurality of different user devices, wherein each of said devices provides media interaction capabilities for one or more communication channels, and wherein each of said devices is mapped to one or more distinct media objects in said SMIL document, wherein when the terminals involved in the communication session communicate directly with each other, no intermediate server is involved with processes messages other than to convey digitally encoded content from one of the terminals to the other.

3. The Web based unified communication system according to claim 2, wherein one of said devices of said terminal is a phone communicating over a PSTN channel after a phone number associated with the POTS phone is dialed by the Web based unified communication system, and wherein another one of said devices is an IP identified device that communicates over an IP communication channel, wherein the Web communications manager uses the SMIL document to synchronize the IP communication channel and the PSTN channel during said communication session, wherein the IP identified device comprises a SML engine that analyzes and distributes media objects through a local SMIL interpreter during the communication session.

4. The Web based unified communication system according to claim 1, wherein said Web communication manager is an application server, and wherein said application server is a Web message server used for recording a message from a caller terminal through a SMIL based multimedia message with timing features, so as to playback the message to the callee.

5. The Web based unified communication system according to claim 1, wherein said unified communication system comprises a plurality of communication domains, each communication domain comprises at least one Web communication manager.

6. The Web based unified communication system according to claim 5, further comprising: a local terminal registry module, for managing terminal information of all terminals that are local relative to the Web communication manager.

7. The Web based unified communication system according to claim 5, further comprising: a local communication policy module for managing local communication policy information.

8. The Web based unified communication system according to claim 7 wherein the Web based unified communication system implements said communication session as a virtual SMIL browser, wherein from a viewpoint of the Web communication manager, the communication session is a playing process of the SMIL document among all devices of the terminals involved in the communication session.

9. The Web based unified communication system according to claim 8, wherein if the callee terminal is located in a different communication domain, said communication controller controls the SMIL document generator to generate a SMIL document for describing the devices of the caller terminal and sends the SMIL document to the Web communication manager in the domain where the callee terminal is located.

10. The Web based unified communication system according to claim 8, wherein if the callee terminal and the call terminal are located in the same communication domain, said communication controller controls the SMIL document generator to generate a SMIL document for defining the communication control logic for communication between these terminals.

11. The Web based unified communication system according to claim 5, wherein said communication controller is used for communicating with said Web message server, receiving a SMIL based multimedia message with timing features, and controlling the SMIL document generator to generate a SMIL document for defining the communication control logic for playing back the multimedia message to the local terminal.

12. The Web based unified communication system according to claim 5, wherein said communication controller is used for communicating with remote Web communication managers, receiving SMIL documents for describing terminal devices from other Web communication managers, and controlling the SMIL document generator to generate a SMIL document for defining the communication control logic for communication between these terminals.

13. A Web based unified communication method, comprising following steps: receiving, at a first terminal, a communication request from a second terminal; receiving, at the first terminal, a SMIL document of the first terminal, the SMIL document generated by a Web communication manager that is local to the first terminal; generating a SMIL document of the second terminal by the Web communication manager;

matching the SMIL document of the first terminal with the SMIL document of the second terminal; generating, by the Web communication manager, a third SMIL document, based on said matching, for starting and controlling a communication session between the first terminal and the second terminal; using the third SMIL document that was generated to establish a connection between the terminals involved in the communication session; interpreting and executing said third SMIL document to control the terminals and communication channels involved in the communication session to work collectively so as to perform the communication session; and once the communication session is established, the terminals involved in the communication session communicating with each other directly; wherein the Web communication manager comprises a communication controller that executes one or more SMIL based communication control tasks in a Web based communication control layer, a SMIL document generator that generates a SMIL document used for starting and controlling of a communication session between said terminals, a SMIL engine that interprets and executes the SMIL document generated by said SMIL document generator to produce commands that control the respective channel controller, and a plurality of channel controllers that control respective communication channels and terminals to perform the communication session, wherein each of the channel controllers are handled by one of the terminals involved in the communication session.

14. A Web communication manager local to a terminal for generating that generates a SMIL document for the terminal based on a communication request from a corresponding terminal, for starting and controlling the SMIL document being used to start and control a communication session between the terminal and corresponding terminals terminal, and controlling to control the terminals terminal and the corresponding terminal and communication channels involved in the communication session through interpretation and execution of the SMIL document to work collectively so as to perform the communication session, wherein the Web communication manager local to the terminal uses the SMIL document that was generated to establish a connection between the terminals involved in the communication session, wherein once the Web communication manager establishes the connection, the terminals involved in the communication session communicate with each other directly; wherein the Web communication manager is implemented by at least one computing device including one or more processors to provide a communication controller that executes one or more SMIL based communication control tasks in the Web based communication control layer, a SMIL document generator that generates a SMIL document used for starting and controlling of a communication session between said terminals, a SMIL engine that interprets and executes the SMIL document generated by said SMIL document generator to produce commands that control the respective channel controller, and a plurality of channel controllers that control respective communication channels and terminals to perform the communication session, wherein each of the channel controllers are handled by one of the terminals involved in the communication session.

15. The Web communication manager according to claim 14, further comprising: a local terminal registry module, for managing terminal information of all terminals that are local relative to the Web communication manager.

16. The Web communication manager according to claim 14, further comprising: a local communication policy module for managing local communication policy information.

17. The Web communication manager according to claim 14, wherein said communication controller is used for communicating with local terminals, receiving a communication request from a local terminal and controlling the SMIL generator to generate a SMIL document for a call.

18. The Web communication manager according to claim 17, wherein if the callee terminal is located in a different domain, said communication controller controls the SMIL document generator to generate a SMIL document for describing the devices of the caller terminal and sends the SMIL document to the Web communication manager in the domain where the callee terminal is located.

19. The Web communication manager according to claim 17, wherein if the callee terminal and the call terminal are located in the same domain, said communication controller controls the SMIL document generator to generate a SMIL document for defining the communication control logic for communication between these terminals.

20. The Web communication manager according to claim 14, wherein said communication controller is used for communicating with said Web message server, receiving a SMIL based multimedia message with timing features, and controlling the SMIL document generator to generate a SMIL document for defining the communication control logic for playing back the multimedia message to the local terminal.

21. The Web communication manager according to claim 14, wherein said communication controller is used for communicating with remote Web communication managers, receiving SMIL documents for describing terminal devices from other Web communication managers, and controlling the SMIL document generator to generate a SMIL document for defining the communication control logic for communication between these terminals.

\* \* \* \* \*